United States Patent [19]

Dukess

[11] 4,166,769

[45] Sep. 4, 1979

[54] SOLAR HEAT APPARATUS

[76] Inventor: Joseph Dukess, 931 Greacen Point Rd., Mamaroneck, N.Y. 10543

[21] Appl. No.: 794,448

[22] Filed: May 6, 1977

[51] Int. Cl.² ............................ C02B 1/04; F24J 3/02
[52] U.S. Cl. .............................. 202/234; 203/DIG. 1; 203/10; 203/100; 126/440
[58] Field of Search ............................ 126/270, 271; 203/DIG. 1, 10, 11, 100, 49; 202/234; 159/15

[56] References Cited

U.S. PATENT DOCUMENTS

| 3,174,915 | 3/1965 | Edlin | 202/234 |
| 3,351,536 | 11/1967 | Fox | 202/234 |
| 3,397,117 | 8/1968 | Smith et al. | 202/234 |
| 4,043,315 | 8/1977 | Cooper | 126/271 |
| 4,056,093 | 11/1977 | Burger | 126/271 |
| 4,057,048 | 11/1977 | Maine | 126/271 |

*Primary Examiner*—Wilbur L. Bascomb, Jr.
*Attorney, Agent, or Firm*—Kenneth S. Goldfarb

[57] ABSTRACT

A solar energy device comprising a body having a plurality of spaced focusing lenses to concentrate direct and reflected rays from the sun. A heat receiving member is inside of said body. One of the body and the member is expansible and contractible so as to direct the member into exact convergence with the focal points of said lenses. The member is supported within said body and fed fluid to be heated. The heated fluid is then removed from the member. The heat receiving member that is expansible and contractible may be employed separately and used as a prime mover.

4 Claims, 5 Drawing Figures

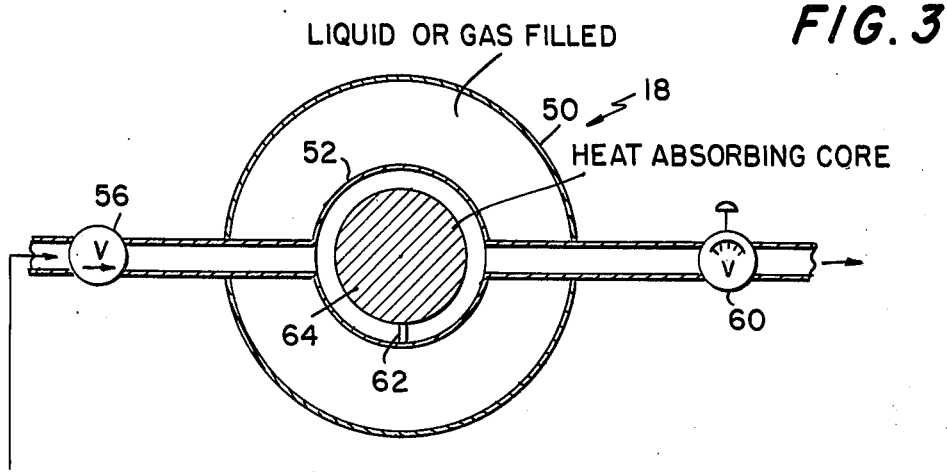
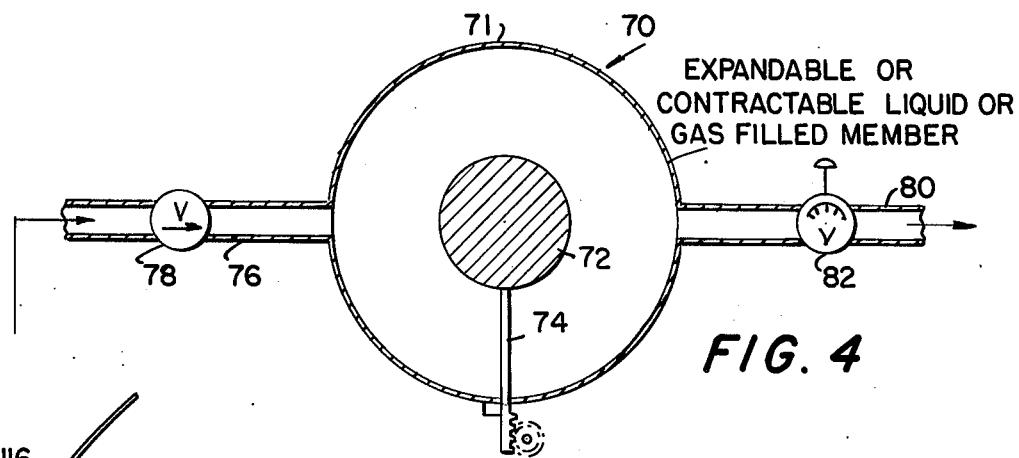
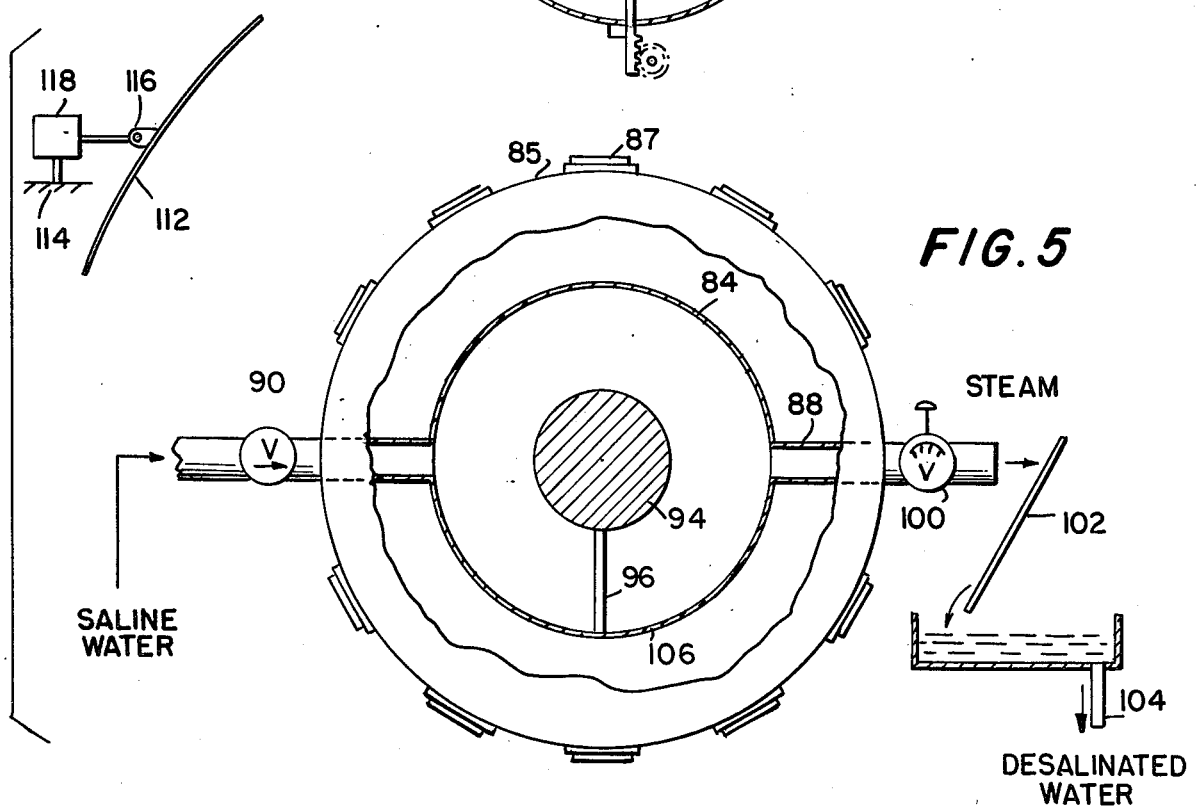

SOLAR HEAT APPARATUS

BACKGROUND OF THE INVENTION

1. FIELD OF THE INVENTION

The present invention relates to a solar energy device, and more particularly to an apparatus for collecting the radiant energy of the sun through direct and reflected rays therefrom.

2. DESCRIPTION OF THE PRIOR ART

In the past various arrangements of lenses have been used to concentrate the rays of the sun for the purpose of extracting solar energy.

In U.S. Pat. No. 3,934,573 there is disclosed the use of a spherical system for directing suns rays through lenses onto a boiler. However, the heat from such rigidly concentrated lenses requires the use of expensive materials for use in the boiler and eliminates the possiblity of using low cost materials in the production of solar energy. No means are provided for moving the boiler skin slightly out of focus upon application of much heat in U.S. Pat. No. 3,934,573.

The expansion of fluids through application of solar radiation is old in the art as shown in U.S. Pat. No. 3,436,908 but such patent does not conceive of an expansible and contractible member for heating fluids. Likewise, U.S. Pat. No. 3,908,631 which is directed to apparatus for converting solar radiation to thermal energy by heating a gaseous stream of air does not utilize an expansible and contractible member for minimizing cost and production difficulties for the solar energy apparatus. This patent shows the use of an inflatable member.

SUMMARY OF THE INVENTION

It is the object of this invention to provide a low cost solar energy device capable of being manufactured out of inexpensive materials, which can be used for individual installations for homes, factories, offices to provide heat and energy, yet which may be made of materials of lower melting temperatures thereby facilitating manufacturing processes.

The concept of the invention is to provide a solar energy device in the form of a body having a plurality of spaced focusing lenses thereon for concentrating direct and reflected rays of the sun. A member is disposed in the body and contains a black heat absorbent core. Either the body or the member is expansible and contractible so as to direct the lenses into focus on the surface of the member until a predetermined temperature is reached whereby the member will expand so its surface is out of the focal point to lessen concentrated heat thereon. Thereafter contraction will return the focal point to the surface of the member and heating continues at optimum rate. The member is suspended on the feed conduit and discharge conduit for delivering fluid to be heated and for receiving heated fluid. The solar energy device is made of easily worked materials including plastics and metals and is adapted for home use for heating, power, and desalinization.

BRIEF DESCRIPTION OF THE DRAWINGS

FIG. 3 is a sectional schematic view illustrating details of the invention;

FIG. 4 is a sectional detail veiw showing in particular the structure of the heating member; and FIG. 5 is a schematic illustration of a desalinization plant in accordance with the concepts of the invention.

DETAILED DESCRIPTION OF THE INVENTION

Figure 1:
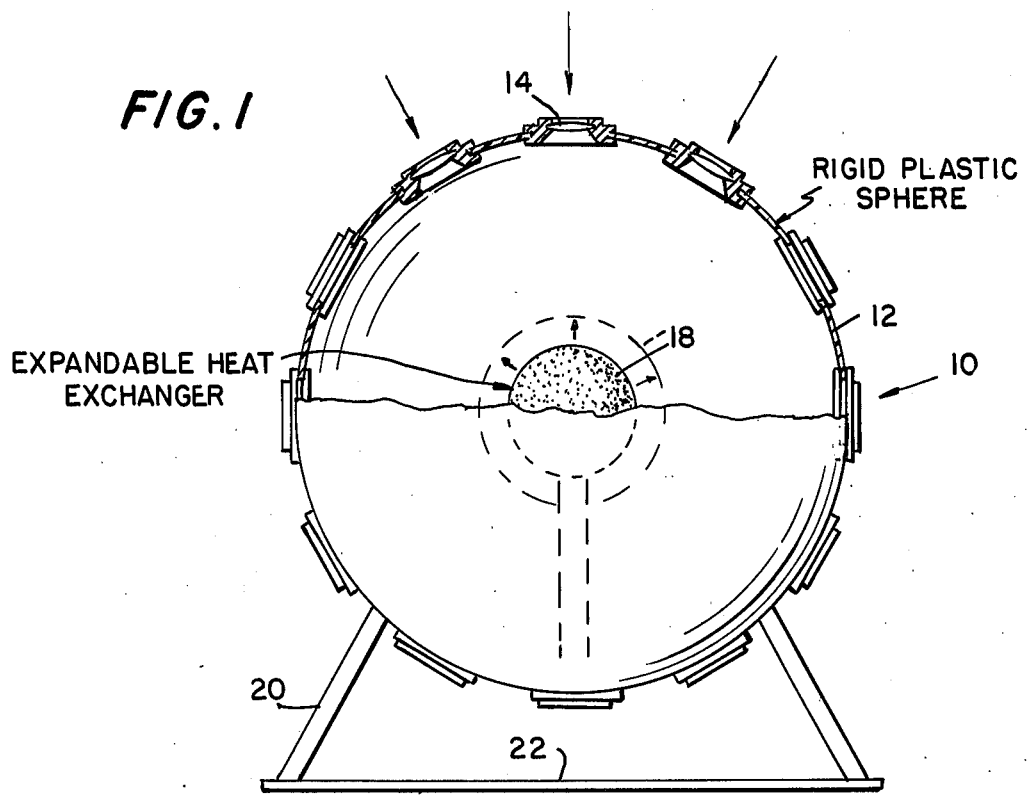
FIG. 1 is a schematic view of an embodiment of the invention employing a rigid body and a flexible member.

With continuing reference to the accompanying drawings wherein like reference numerals designate similiar parts throughout the various views, reference numeral 10 designates an embodiment of the solar heating device as shown in FIG. 1. In this embodiment a rigid sphere 12 of plastic or metal is provided with a plurality of lenses 14 for focusing both direct and reflected rays from the sun. The sphere 12 may be transparent. The lenses 14 are disposed about the entire surface of the sphere 12. The lenses and/or the entire inner surface of the sphere 12 may be coated with a reflecting film. Within the sphere 12 there is an expansible and contractible body 18, the details of the construction being shown in FIGS. 3 through 5. The spherical body 12 is supported by stanchions or suitable supports 20 above a mirror reflecting surface 22.

Figure 2:
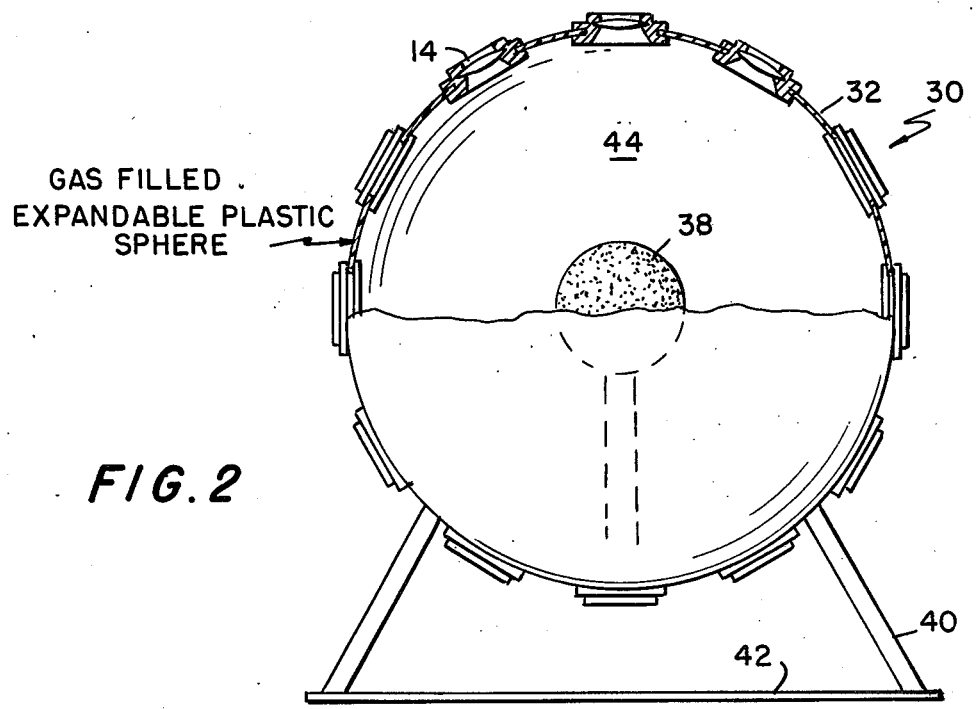
FIG. 2 is view similar to FIG. 1, illustrating another embodiment of the invention wherein the body is flexible and the member is rigid.

FIG. 2, there is shown a form 30 of invention wherein the spherical body 32 is made of a flexible clear resilient material having lenses 34 mounted all about its surface and having a fluid heating member 38 therein which may be rigid or similar to the member 18. The sphere is mounted on standards 40 above a reflecting surface 42. The spherical body may be filed with fluid, or an inert gas 44.

The heating member may be in the form shown in FIG. 3. Herein the member 18 includes an expansible and contractible sphere 50 having therein a boiler 52 connected to intake conduct 54 provided with a one way valve 56 and a discharge conduit 58 provided with a pressure gage 60. The space between the member sphere 50 and the boiler 52 is filled with a fluid, preferably a gas. Inside the boiler 52 there is supported at 62 a black heat absorbing body 64.

In operation the rays of the sun are directed through lenses 14 onto the surface of the sphere 50. When the sphere 50 has been heated to the point of convergence with the focal point of lenses 14 it will expand beyond the focal point unless additional cold fluid is introduced into the boiler 52 or some fluid is allowed to escape. This allows for expansion and contraction out of the focal point of the lenses to prevent spot burnout of the boiler and permit cheaper materials to be used while making sure of the most available heat.

In FIG. 4 there is shown a modified form of the heating member 70 which may be used separately. The heating member 70 is an expansible shell 71 having an inlet conduit 76 connected thereto which is provided with a one way inlet valve. Discharge conduit 80 provided with a valved pressure gage to serve as a pressure regulator is connected to the shell 71. A black body 72 supported at 74 is provided within the shell 71 to absorb heat and distribute heat to incoming fluid. Fixed to the expansible shell 71 is a mounting plate carrying a toothed rod 75 which engages a gear 77 for driving a shaft 79. The gear 77 may have one direction of rotation. In this form of the invention the member 70 can be placed in body or may derive its heat from a mirror, parabolic reflector or receiver or the like and may be used to transport, for example, a parabolic mirror. The shaft 79 when rotated can carry the reflector along a solar track. As a cloud cover develops when the shell 71 is contracting a ratchet arrangement could disengage the movement of the reflector. As solar heat redevelops the drive of the shaft 79 would keep the reflector moving. Thus the arrangement could track mirrors and other heat seeking devices. After a predetermined length of time the various devices could be sent back, by spring device or the like, for the start of another solar day.

As shown in FIG. 5, this solar energy device may be employed for desalinization of water. In this embodiment the body 85 is provided with lenses 87. The body 85 may be transparent and the body and the lenses may be provided with all inner "one way" coating. The heating member 84 is mounted within the body 80 by inlet conduit 86 connected to a source of saline water and by discharge conduit 88. Saline water entering through one way valve 90 will pass into the heating member 84 where the saline water will be in contact with black body 94 supported at 96 within the heating member 84. Heat from the focussed suns rays on the member 84 will turn the saline water to steam and salt. The steam will be at a pressure regulated by pressure gage and valve 100 and will flow into a condenser, shown schematically by condenser plate 102 and thence at 104 to a reservoir for further consumption. The salt can be removed by flushing with salt water pericodically or through use of an access port 106.

In order to enhance heating capabilities a reflector, such as a parabolic reflector, may be employed and mounted for more than one degree of movement about a track on a universal joint controllable by a direct mechanical linkage as heretofore described with reference to FIG. 4, or by a sun following photoelectric device 118. Thus the reflector can move to assume an optimum position by following the sun.

While the solar energy device has been described in several embodiments herein, it is recognized that variations and changes may be made within the scope of the appended claims.

We claim:

1. A solar energy device comprising body means, an expansible and contractable member means inside said body means, lens means including a plurality of spaced focusing lenses on said body means for concentrating direct and reflected rays from the sun onto said member means to heat said member means to expand and contract said member means to direct said member means into exact convergence with the focal points of said lenses in accordance with heat from sun rays focused on said member means, heat absorbing core means in said member means, means for introducing fluid to be heated into said member means and means for removing heated fluid from said member means.

2. A solar energy device comprising body means having len means including a plurality of spaced focusing lenses for concentrating direct and reflected rays from the sun, heat-receiving member means inside said body means, fluid means in said body means for expanding and contracting said body means said lens means directing sun's rays onto said member means for heating said member means and said fluid means and for positioning said lenses with focal points of said lenses in alignment with said member means, means for introducing said other fluid to be heated into said member means, and means for removing fluid from said member means.

3. A solar energy device according to claim 2, wherein said means for introducing said other fluid into said member means and said means for removing said other fluid from said member means support said member means within said body means.

4. A solar enery device according to claim 1 including a reflecting surface and means for supporting said body means above said reflecting surface.

* * * * *